US012231815B2

(12) United States Patent
Abhishek et al.

(10) Patent No.: US 12,231,815 B2
(45) Date of Patent: *Feb. 18, 2025

(54) PARAMETERS FOR OVERLAY HANDLING FOR IMMERSIVE TELECONFERENCING AND TELEPRESENCE FOR REMOTE TERMINALS

(71) Applicant: TENCENT AMERICA LLC, Palo Alto, CA (US)

(72) Inventors: Rohit Abhishek, San Jose, CA (US); Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/832,056

(22) Filed: Jun. 3, 2022

(65) Prior Publication Data
US 2022/0303503 A1   Sep. 22, 2022

Related U.S. Application Data

(63) Continuation of application No. 17/095,239, filed on Nov. 11, 2020, now Pat. No. 11,381,777.

(60) Provisional application No. 63/039,336, filed on Jun. 15, 2020.

(51) Int. Cl.
*H04N 7/15* (2006.01)
*H04N 7/14* (2006.01)

(52) U.S. Cl.
CPC ............... *H04N 7/157* (2013.01); *H04N 7/14* (2013.01)

(58) Field of Classification Search
None
See application file for complete search history.

(56) References Cited

U.S. PATENT DOCUMENTS

| 5,896,128 A * | 4/1999 | Boyer ................. H04N 7/147 715/716 |
| 8,373,741 B2 * | 2/2013 | Roberts ............. G06F 3/04817 348/14.04 |
| 2005/0144279 A1 * | 6/2005 | Wexelblat ........... G06Q 30/06 709/225 |
| 2016/0073155 A1 * | 3/2016 | Subramaniam .... H04N 21/4316 725/32 |
| 2018/0122142 A1 * | 5/2018 | Egeler ................. G06F 3/011 |

(Continued)

FOREIGN PATENT DOCUMENTS

KR   10-2019-0138758 A   12/2019

OTHER PUBLICATIONS

Intel et al., "ITT4RT Permanent Document—Requirements, Working Assumptions and Potential Solutions", 3GPP TSG-SA4 Meeting #108e, S4-200507, Online Meeting, Apr. 6-9, 2020 (42 pages total).

(Continued)

*Primary Examiner* — Quoc D Tran
(74) *Attorney, Agent, or Firm* — Sughrue Mion, PLLC

(57) ABSTRACT

A method, computer program, and computer system for video conferencing is provided. Video data associated with an immersive teleconferencing session is received. A parameter associated with the video data is identified, whereby the parameter specifies overlay data associated with the immersive teleconferencing session. The video data is displayed with one or more overlays based on the identified parameter.

20 Claims, 9 Drawing Sheets

(56) References Cited

U.S. PATENT DOCUMENTS

| | | | |
|---|---|---|---|
| 2018/0203577 A1* | 7/2018 | Astavans | H04N 7/147 |
| 2018/0341811 A1 | 11/2018 | Bendale et al. | |
| 2019/0104326 A1* | 4/2019 | Stockhammer | H04L 67/02 |
| 2019/0379884 A1 | 12/2019 | Oh et al. | |
| 2020/0108316 A1 | 4/2020 | Nay | |
| 2020/0250891 A1* | 8/2020 | Curcio | H04N 21/85406 |

OTHER PUBLICATIONS

Hannuksela (Nokia) M M et al., "(29.1) [OMAF] 3D mesh scheme types", 130. MPEG Meeting; Apr. 20, 2020-Apr. 24, 2020; Alpbach; (Motion Picture Expert Group or ISO/IEC JTC1/SC29/WG11), No. m53948, Apr. 22, 2020 (312 pages total).

Wang et al., "Consistency on Content Overlay between ISOBMFF and OMAF", International Organisation for Standardisation Organisation Internationale De Normalisation ISO/IEC JTC1/SC29/WG11 Coding of Moving Pictures and Audio, ISO/IEC JTC1/SC29/WG11 MPEG2016/M45892, Jan. 2019, Marrakech, MA (19 pages total).

Extended European Search Report dated Sep. 13, 2022 from the European Patent Office in EP Application No. 21826359.8.

Hyeji Kim et al., "Efficient Neural Network Compression", <Downloaded from the Internet: https://arxiv.org/pdf/1811.12781.pdf> <Downloaded on: Jun. 14, 2021>, Published 2019, 9 pages total.

International Search Report dated Aug. 5, 2021, issued by the International Searching Authority in application No. PCT/US2021/026798.

Written Opinion dated Aug. 5, 2021, issued by the International Searching Authority in application No. PCT/US2021/026798.

"ITT4RT Permanent Document—Requirements, Working Assumptions and Potential Solutions", 3GPP TSG-SA4 Meeting #109e Online Meeting, May 20-Jun. 3, 2020, Version 0.7.1, S4-200840.

Office Action dated Mar. 31, 2023 from the Korean Intellectual Property Office in KR Application No. 10-2022-7007778.

* cited by examiner

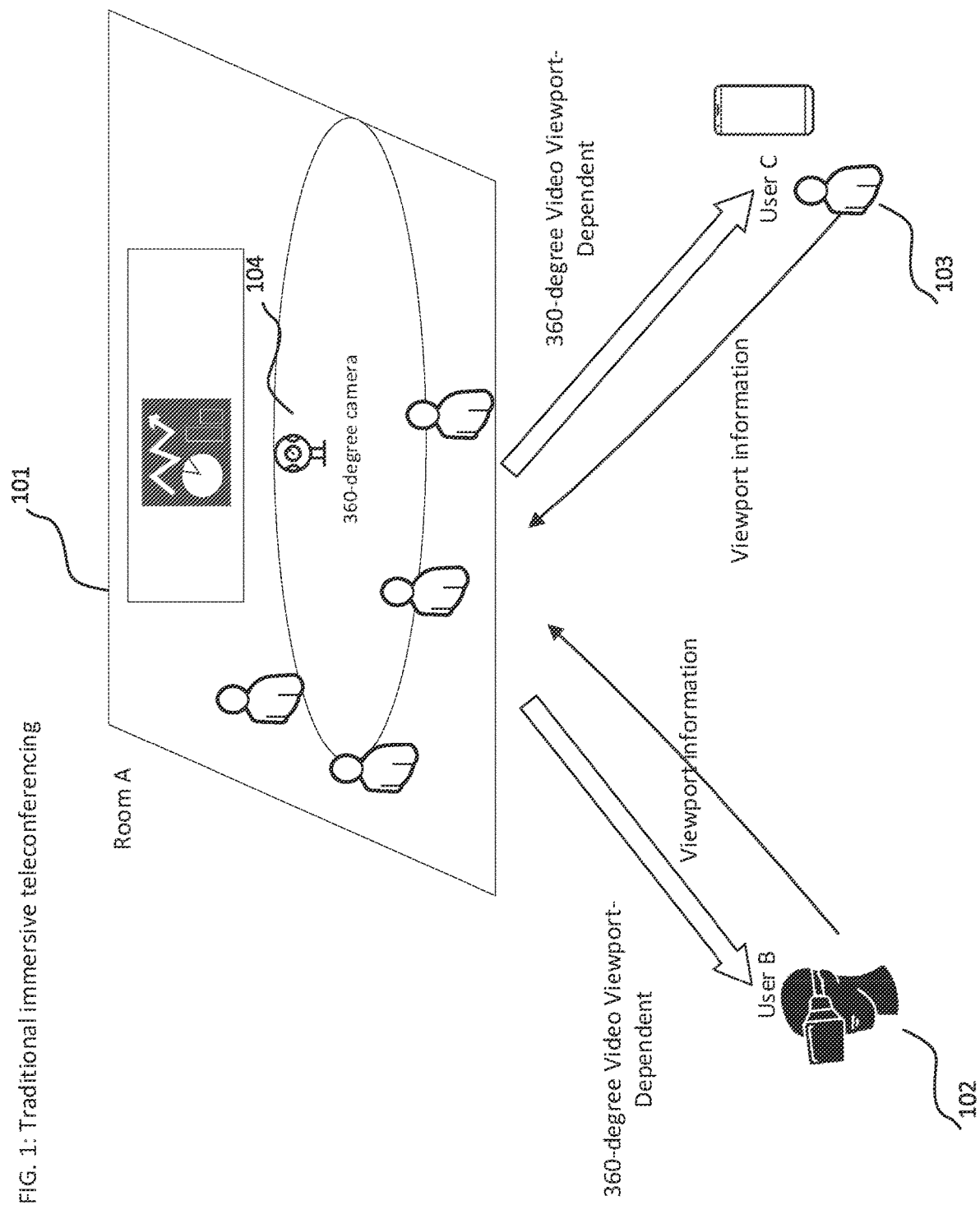
FIG. 1: Traditional immersive teleconferencing

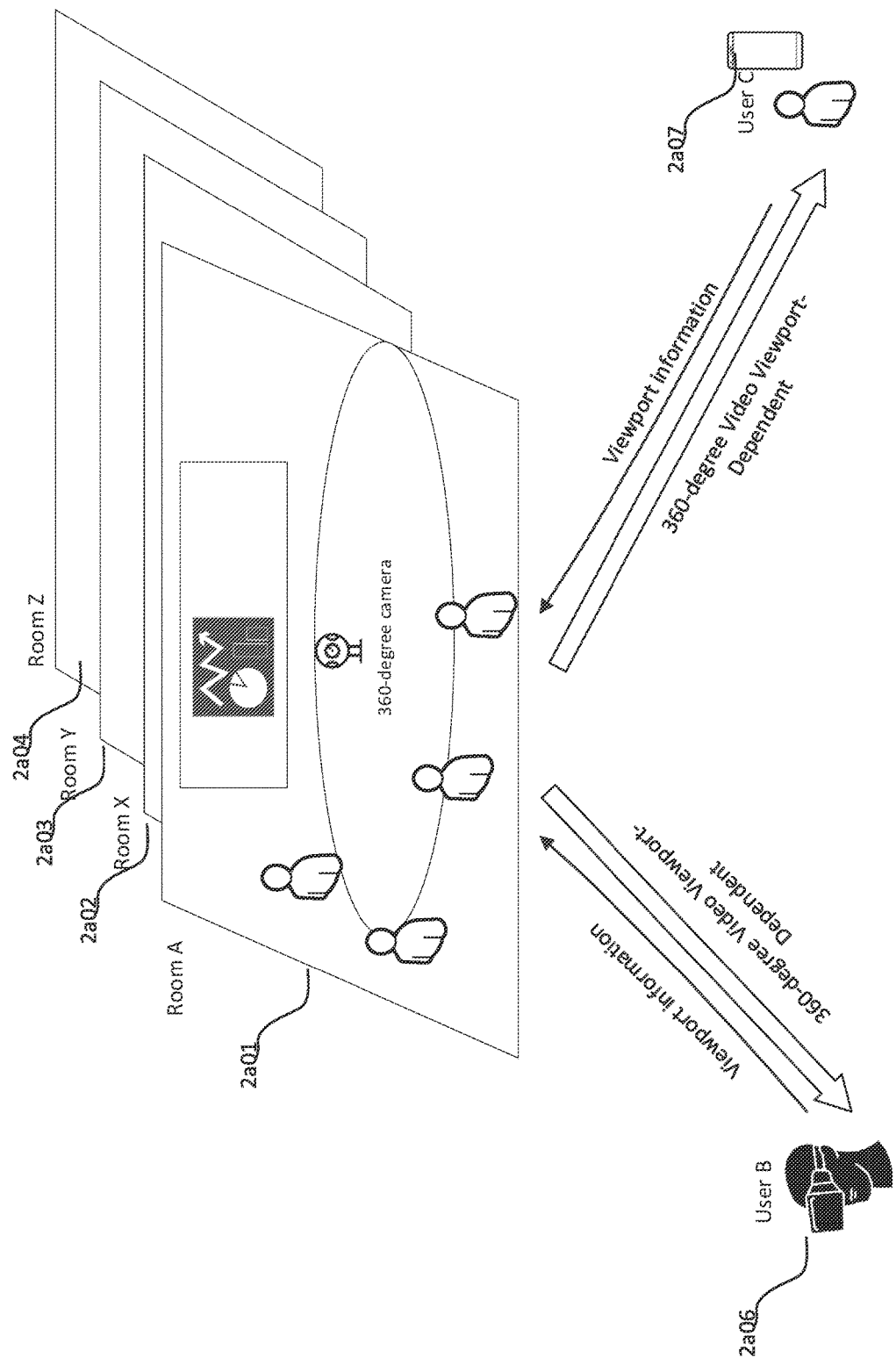
FIG. 2a: Multiparty multiconference room teleconferencing without MRF/MCU

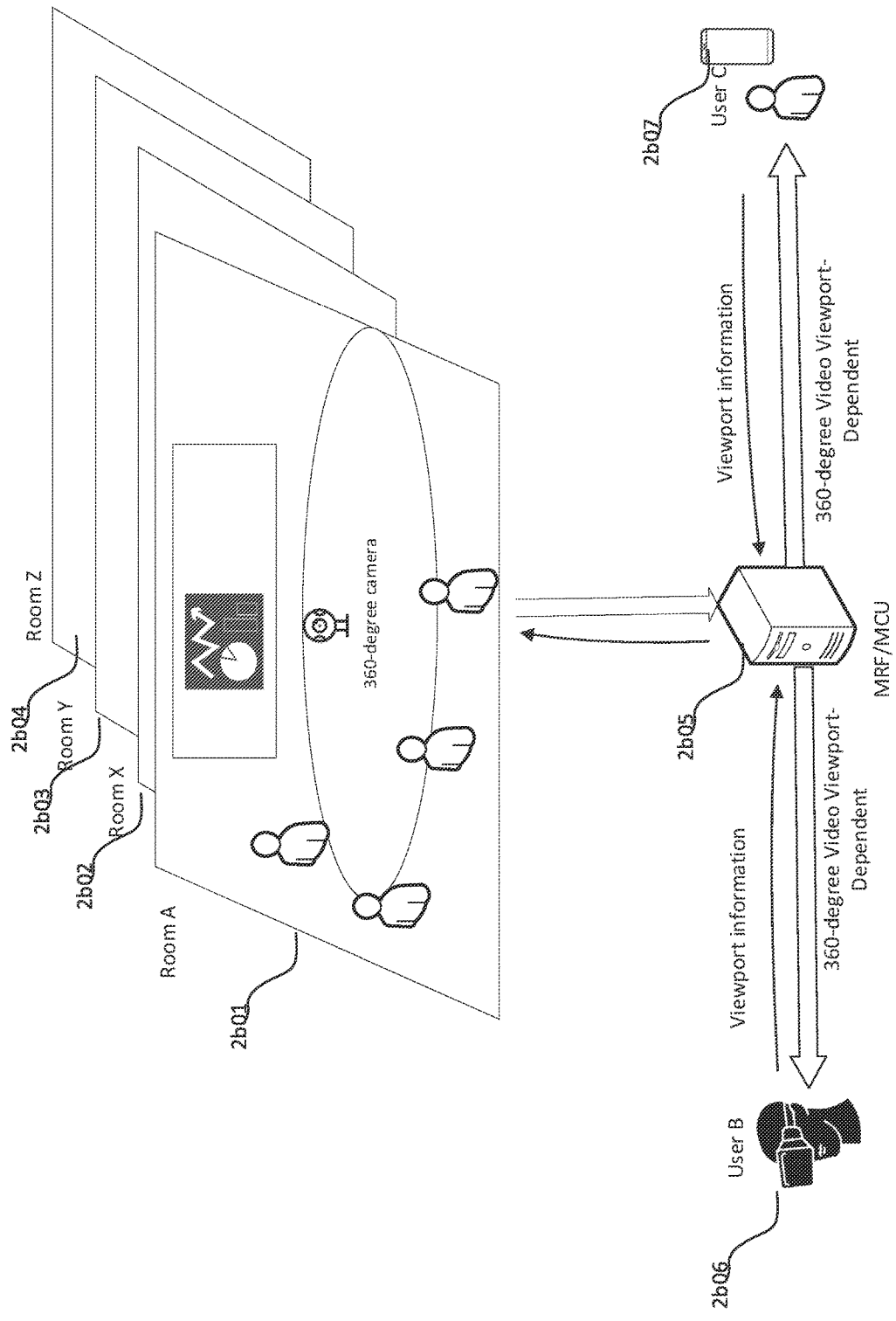
FIG. 2b: Multiparty multiconference room teleconferencing with MRF/MCU

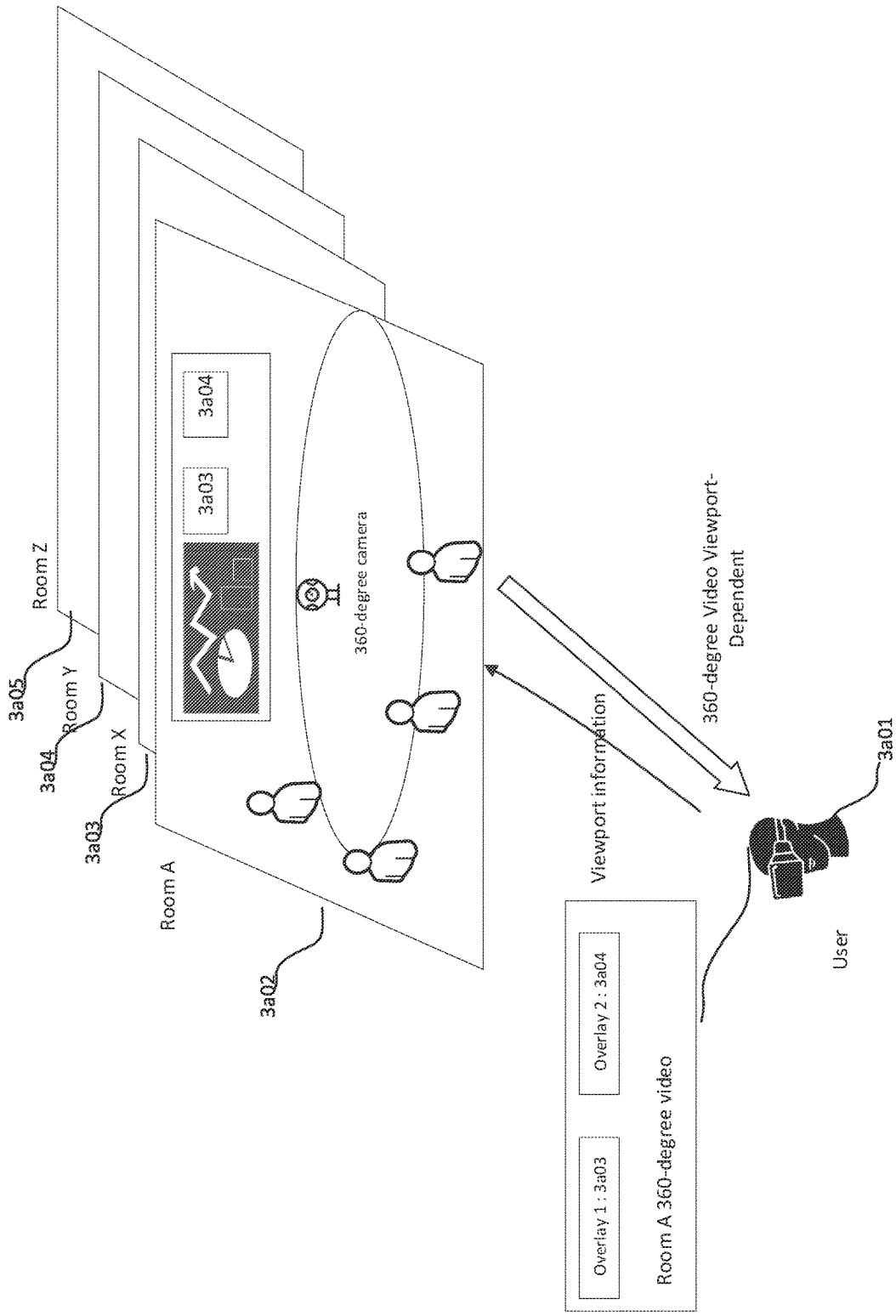
FIG. 3a: Multiparty multiconference room teleconferencing with overlays from single sender without MRF/MCU

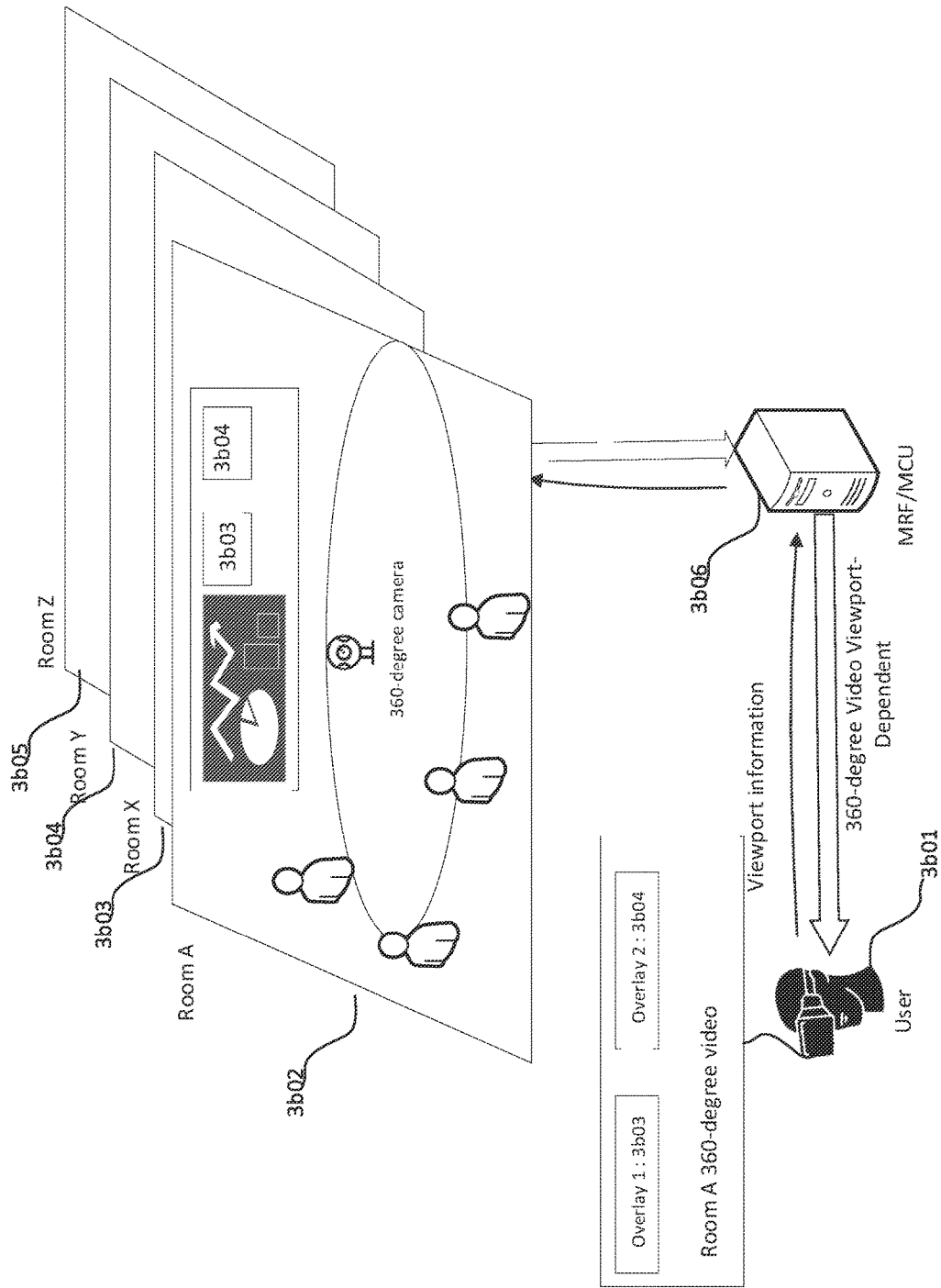
FIG. 3b: Multiparty multiconference room teleconferencing with overlays from single sender without MRF/MCU

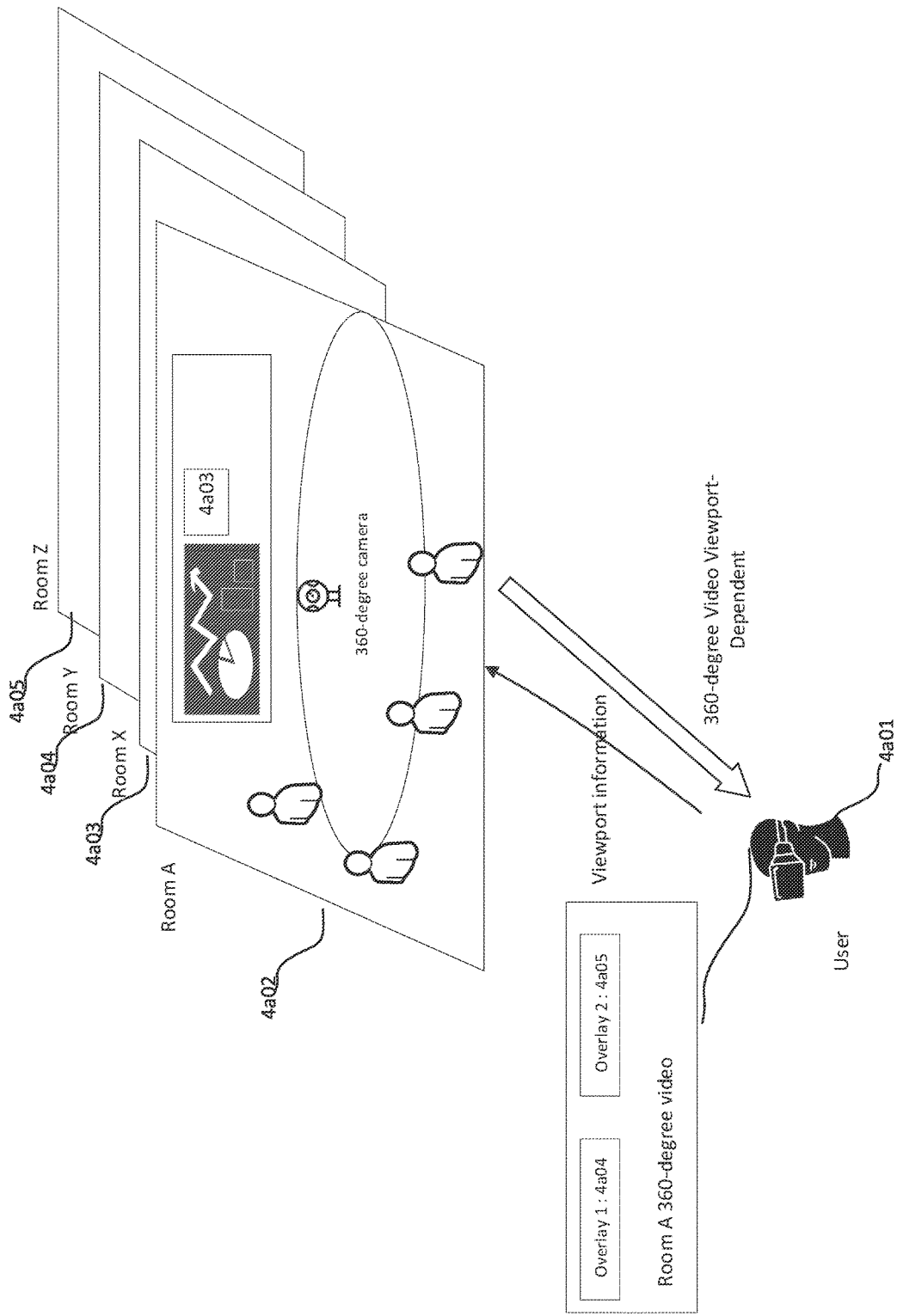
FIG. 4a: Multiparty multiconference room teleconferencing with overlays from multi-sender without MRF/MCU

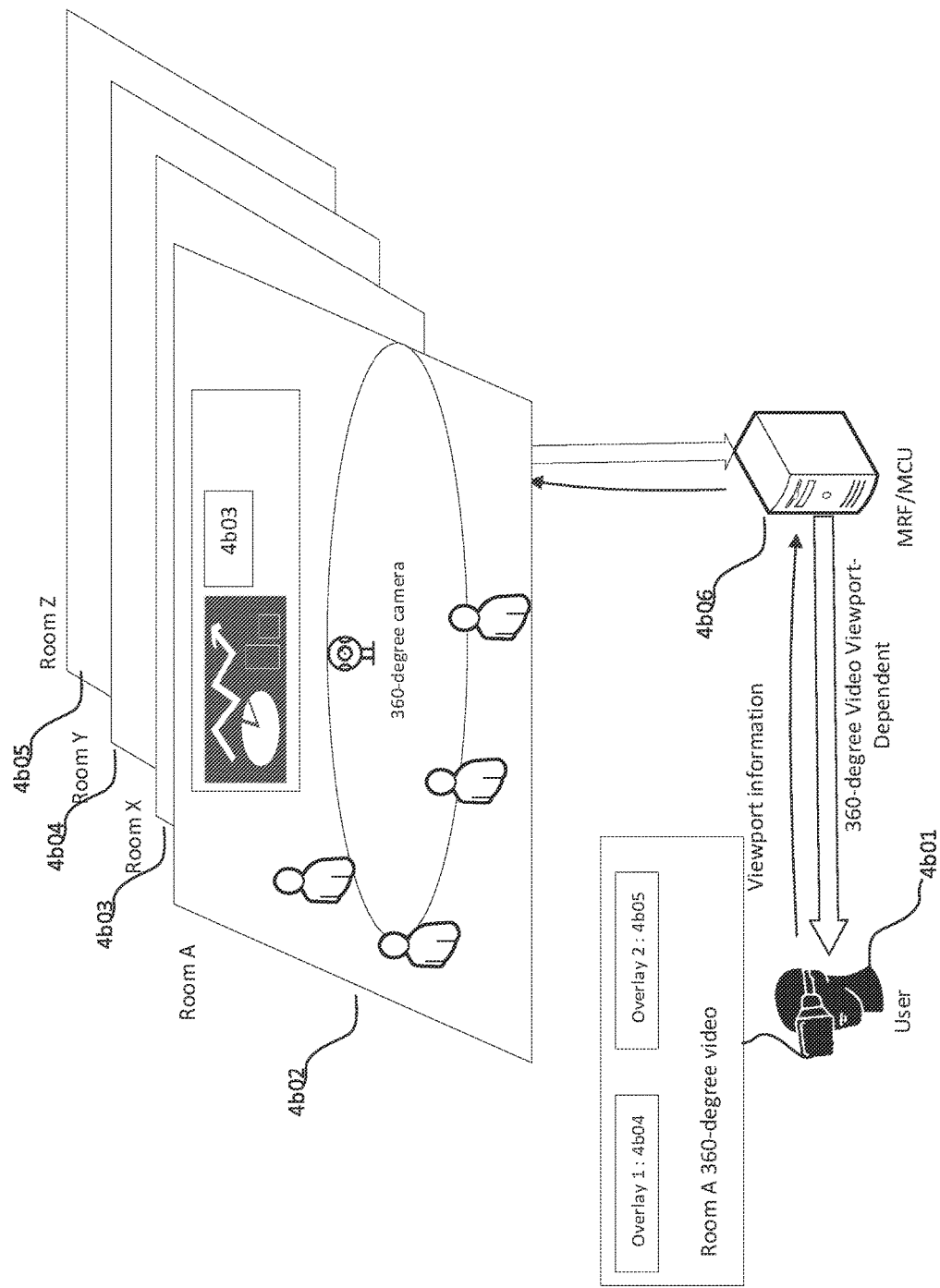

Computer System 600

PARAMETERS FOR OVERLAY HANDLING FOR IMMERSIVE TELECONFERENCING AND TELEPRESENCE FOR REMOTE TERMINALS

CROSS-REFERENCE TO RELATED APPLICATION

This application is a Continuation Application of U.S. application Ser. No. 17/095,239, filed on Nov. 11, 2020, which claims priority from U.S. Provisional Patent Application No. 63/039,336, filed on Jun. 15, 2020, in the U.S. Patent and Trademark Office, the entireties of which are incorporated herein.

FIELD

The disclosed subject matter relates to overlay handling for Immersive Teleconferencing and Telepresence for Remote Terminals (ITT4RT), and more specifically, to the signaling of overlays for omnidirectional video and images, for example viewing a presentation/screen share stream or a 2D video as an overlay on top of the 360 video stream.

BACKGROUND

When an omnidirectional media stream is used, only the part of the content corresponding to the user's viewport is rendered, while using a head-mounted display (HMD), giving the user a realistic view of the media stream.

FIG. 1 illustrates a traditional scenario (scenario 1) for an immersive teleconference call, where the call is organized among A (101), B (102), and C (103). Here, A represents a conference room with an omnidirectional camera (104), and B and C are remote participants using HMD and mobile device, respectively. In this case, participants B and C send their viewport orientation to A, which in turn sends them the viewport dependent stream.

An extended scenario (scenario 2) is shown in FIG. 2a which comprises of multiple conference rooms (2a01, 2a02, 2a03, 2a04). The users B (2a06) uses an HMD to view the video, and user C (2a07) uses a mobile device to view the stream. B and C send their viewport orientation to the room, which in turn sends them the viewport dependent stream. Another scenario is when the call is set up using an MRF/MCU (2b05), as shown in FIG. 2b, where Media Resource Function (MRF) and Media Control Unit (MCU) are multimedia servers that provide media-related functions for bridging terminals in a multiparty conference call. Here, the conference rooms send their respective videos to the MRF/MCU. These videos are viewport independent videos, i.e., the entire 360-degree video is sent to the media-server irrespective of the user's viewport streaming the particular video. The media server receives the viewport orientation of the users (B (2b06) and C (2b07)) and accordingly sends them the viewport-dependent streams.

Further, in the extended scenario, the remote users can choose one of the available 360-degree videos from the conference rooms (2a01-2a04/2b01-2b04) to view. In this case, the user sends the information to the conference room or MRF/MCU about the video it would like to stream and its viewport orientation. The user can trigger switching from one room to another based on the active speaker. In addition, the media-server may pause receiving a video stream from any conference room which does not have any active users.

ISO 23090-2 defines overlay to be a "piece of visual media rendered over omnidirectional video or image item or over a viewport." Now refer back to FIG. 2a/2b, when any presentation is being shared by any participant in conference room A, besides being displayed in conference room A, this presentation is also broadcasted as stream to other users. This stream can be overlaid on top of the 360-degree video. Additionally, overlays can also be used for 2D streams.

There can be two types of overlay rendering defined for use in ITT4RT
- viewport-relative overlay
- Sphere-relative 2D overlay The following parameter can be defined for "Sphere-relative two-dimensional overlay" which are aligned with OMAF specifications:
  overlay_ID, overlay_azimuth, overlay_elevation, overlay_tilt, overlay_azimuth_range, overlay_elevation_range, overlay_rot_yaw, overlay_rot_pitch, and overlay_rot_roll, region_depth_minus1, timeline_change_flag, name For "Viewport Related Overlays," the following parameters can be defined for ITT4RT:
  overlay_ID, overlay_rect_left_percent, overlay_rect_top_percent, overlay_rect_width_percent, overlay_rect_height_percent, relative_disparity_flag, disparity_in_percent, disparity_in_pixels, name.

With respect to the user interactions with overlays, the overlay signally can include the following parameters additionally:
  change_position_flag, change_depth_flag, switch_on_off_flag, change_opacity_flag, resize_flag, rotation_flag, change_position_flag, change_depth_flag, switch_on_off_flag, change_opacity_flag, resize_flag, rotation_flag.

SUMMARY

Embodiments relate to a method, system, and computer readable medium for video conferencing. According to one aspect, a method for video conferencing is provided. The method may include receiving video data associated with an immersive teleconferencing session. A parameter associated with the video data is identified, whereby the parameter specifies overlay data associated with the immersive teleconferencing session. The video data is displayed with one or more overlays based on the identified parameter.

According to another aspect, a computer system for video conferencing is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving video data associated with an immersive teleconferencing session. A parameter associated with the video data is identified, whereby the parameter specifies overlay data associated with the immersive teleconferencing session. The video data is displayed with one or more overlays based on the identified parameter.

According to yet another aspect, a computer readable medium for video conferencing is provided. The computer readable medium may include one or more computer-readable storage devices and program instructions stored on at least one of the one or more tangible storage devices, the program instructions executable by a processor. The program instructions are executable by a processor for performing a method that may accordingly include receiving video data associated with an immersive teleconferencing session. A parameter associated with the video data is identified, whereby the parameter specifies overlay data associated with the immersive teleconferencing session. The video data is displayed with one or more overlays based on the identified parameter.

BRIEF DESCRIPTION OF THE DRAWINGS

These and other objects, features and advantages will become apparent from the following detailed description of illustrative embodiments, which is to be read in connection with the accompanying drawings. The various features of the drawings are not to scale as the illustrations are for clarity in facilitating the understanding of one skilled in the art in conjunction with the detailed description. In the drawings:

FIG. 1 is a schematic illustration of the ecosystem for immersive teleconferencing.

FIG. 2a is a schematic illustration of multiparty multi-conference room teleconferencing without MRF/MCU.

FIG. 2b is a schematic illustration of multiparty multi-conference room teleconferencing with MRF/MCU.

FIGS. 3a and 3b illustrate multiparty multiconference room teleconferencing with overlays from a single sender without MRF/MCU.

FIG. 4a Multiparty multiconference room teleconferencing with overlays from multi-sender without MRF/MCU.

FIG. 4b Multiparty multiconference room teleconferencing with overlays from multi-sender with MRF/MCU.

DETAILED DESCRIPTION

Figure 5:
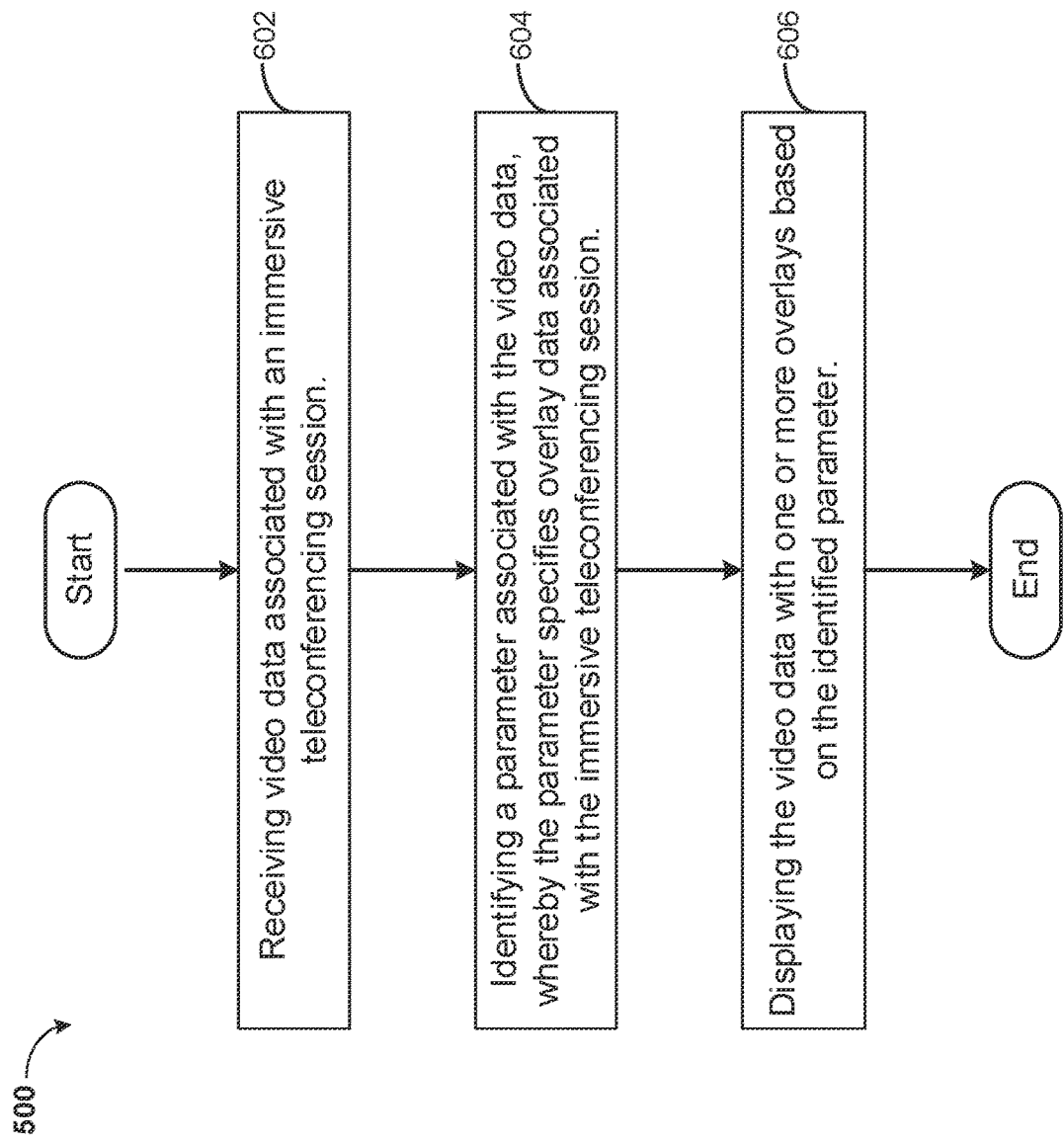
FIG. 5 is an operational flowchart illustrating the steps carried out by a program for immersive teleconferencing.

Detailed embodiments of the claimed structures and methods are disclosed herein; however, it can be understood that the disclosed embodiments are merely illustrative of the claimed structures and methods that may be embodied in various forms. Those structures and methods may, however, be embodied in many different forms and should not be construed as limited to the exemplary embodiments set forth herein. Rather, these exemplary embodiments are provided so that this disclosure will be thorough and complete and will fully convey the scope to those skilled in the art. In the description, details of well-known features and techniques may be omitted to avoid unnecessarily obscuring the presented embodiments.

Aspects are described herein with reference to flowchart illustrations and/or block diagrams of methods, apparatus (systems), and computer readable media according to the various embodiments. It will be understood that each block of the flowchart illustrations and/or block diagrams, and combinations of blocks in the flowchart illustrations and/or block diagrams, can be implemented by computer readable program instructions.

The present disclosure introduces the overlay parameter to define the maximum number of overlays the user at the receiver can use.

The present disclosure introduces the overlay parameter to define the list of the overlays that a sender is sharing.

The present disclosure introduces the overlay parameter to define the list of the overlays that a sender is sharing and the user at the receiver wants to use.

The present disclosure introduces the overlay parameter to define if the user at the receiver is allowed to use overlays from streams other than the ones shared by the sender of the 360-degree video on top of the 360-degree video.

The present disclosure introduces the overlay parameter to define the list of the allowed senders that a user at the receiver may use their overlayers with the ones shared by the sender of the 360-degree video.

With respect to immersive teleconferencing, when an overlay video or image is superimposed on a 360-degree video, it should include information such as
 the overlay source which specifies the image or the video being used as an overlay
 overlay rendering type describing if the overlay is anchored relative to the viewport or sphere
 rendering properties such as opacity
 user interaction properties Refer back to FIGS. 2a-2b, where multiple conference rooms with an omnidirectional camera are in a teleconference, and a user chooses video stream from one of the conference rooms to be displayed as an immersive video. Now, when any additional presentation material/share screen is used with the 360-degree video the user is streaming, it is sent as a separate stream as an overlay on top of the 360-degree video.

In an embodiment, refer to FIGS. 3a and 3b, where a user (3a01, 3b01) is streaming an immersive video, on his HMD, from a teleconference room A (3a02, 3b02). Room A uses screen share to display the video streams coming from conference room X (3a03, 3b03) Y (3a04, 3b04), and Z (3a05, 3b05) where X is streaming a 2D video stream, and Y and Z streams a presentation stream. The streams from X, Y, and Z are also broadcasted to all other remote users. The user may use a parameter "max overlay" which can be defined as the maximum number of overlays that a user can support. This value may be based upon the user's resource availability. This capacity may be offered in the Session Description Protocol (SDP) during the initial offer-answer negotiation and may also be negotiated during the sessions as per the change in user's resource availability, such as the device's battery consumption, bandwidth availability, etc. The case max_overlay=0 is reserved for the scenario when the receiver does not support any overlay. The same is depicted in FIG. 3b when MRF/MCU (3b06) is used for setting up the call.

In the same or another embodiment, an additional parameter "list_overlay" is defined, which may contain the list of the overlays (by listing their overlay id, overlay_ids), which the sender is sharing. This may be sent by the sender to the receiver, and the receiver may select the overlays to be streamed from the list, and send the reduced list in to the sender. This parameter may be negotiated during the initial offer-answer negotiation or renegotiated during the session and is offered in SDP. The case list_overlay=0 is reserved for scenarios when no overlay is supported by the receiver, i.e., when max_overlay equals 0. The total number of overlays sent by the sender to the user should be less than the max_overlay value.

In the same or another embodiment, besides sending the list of the overlays, the sender may also send the overlay priority, which may be included in the "list overlay" parameter. This priority is set by the sender and is based on the content of the stream. For example, any supporting materials for a presentation will be given higher priority as compared to a 2D video from any other room. Besides this, the sender may also optionally send the bandwidth and the decoding computational requirements for each of the overlays. list_overlay equals zero is reserved for the scenario when the sender does not send any overlay list to the user, and as a result, the user receives no overlays. The user, upon receiving the overlay list from the sender, will reply with the list of overlays it can support. This may be based on the overlay priority and the overlay characteristics sent by the sender as well as the receiver's computing resources and the available network bandwidth for the receiver. This may be defined under parameter "list_overlay". These parameters may be negotiated during the initial offer-answer negotiation or during the sessions and are offered in SDP. Consider a scenario when, during the session, the user's bandwidth is reduced. When this happens, the "max_overlay" and optionally "list_overlay" parameters may be renegotiated and as a result the value of list_overlay may decrease.

In another embodiment, refer to FIG. 4a, when considering the scenario when the client wants to use the 360-degree video stream from A, however, it wants to use overlay from Y (4a304), and Z (4a305) whose streams are not shared by A. In this case client needs to know if the sender of the 360-degree video stream may allow the user to use overlays from other sources to be streamed on its video i.e., with 360-degree video stream from A. To do so, "use_other_overlay_flag" parameters may be added. use_other_overlay_flag, when set to 1, specifies that the users are allowed to use overlays from other senders which are not shared by the sender of the 360-degree video. This value may be set by the sender whose 360-degree video is being streamed. The same is depicted in FIG. 4b when MRF/MCU (4b06) is used for setting up the call. The "use_other_overlay_flag" with value 0 means that the receiver is not allowed to use any other sender's overlays with this sender's video stream.

In the same or another embodiment, when the use_other_overlay_flag equals 1, the sender may send the receiver a list of other senders that their overlays may be used with its 360-degree video stream. This can be defined using the parameter "list_allowed_sender_overlays". When use_other_overlay_flag equals 0, the user is not allowed to overlay streams from other remote users/conference rooms whose streams are not shared by the 360-degree video stream sender.

In the same or another embodiment, the above mention parameters can be used for rendering of sphere-relative two-dimensional overlay as well as for viewport-relative overlay.

Figure 6:
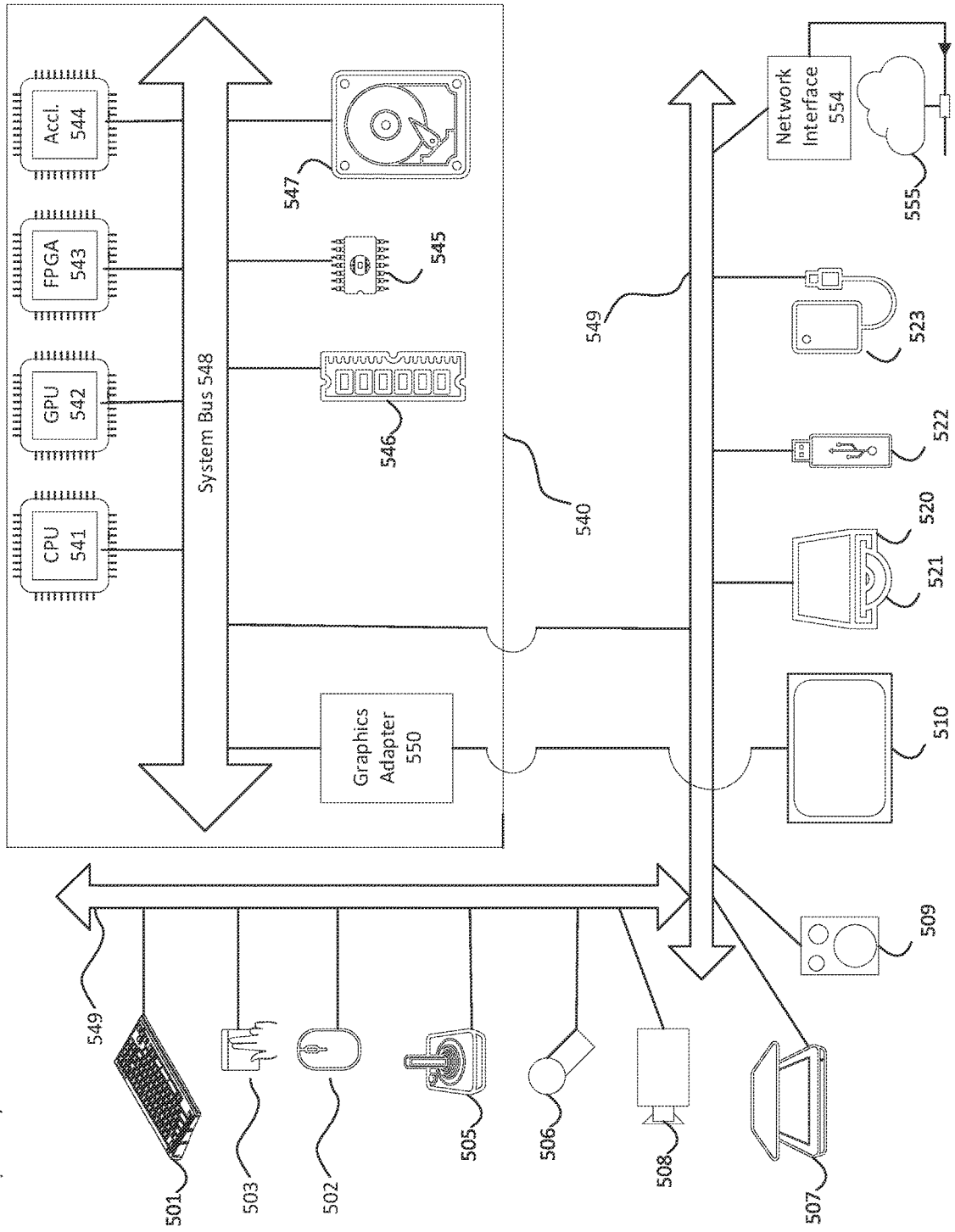
FIG. 6 is a schematic illustration of a computer system.

The techniques for overlay handling for immersive teleconferencing and telepresence, described above, can be implemented as computer software using computer-readable instructions and physically stored in one or more computer-readable media. For example, FIG. 6 shows a computer system 600 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Referring now to FIG. 5, an operational flowchart illustrating a method 500 carried out by a program that matches queries based on co-attention scores is depicted.

At 602, the method 500 includes receiving video data associated with an immersive teleconferencing session.

At 604, the method 500 includes identifying a parameter associated with the video data, whereby the parameter specifies overlay data associated with the immersive teleconferencing session.

At 606, the method 500 includes displaying the video data with one or more overlays based on the identified parameter.

It may be appreciated that FIG. 5 provides only an illustration of one implementation and does not imply any limitations with regard to how different embodiments may be implemented. Many modifications to the depicted environments may be made based on design and implementation requirements.

The components shown in FIG. 6 for computer system 600 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 600.

Computer system 600 may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices can also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard 501, mouse 502, trackpad 503, touch screen 510, data-glove (not depicted), joystick 505, microphone 506, scanner 507, camera 508.

Computer system 600 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 510, data-glove (not depicted), or joystick 505, but there can also be tactile feedback devices that do not serve as input devices), audio output devices (such as speakers 509, headphones (not depicted)), visual output devices (such as screens 510 to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system 600 can also include human accessible storage devices and their associated media such as optical media including CD/DVD ROM/RW 520 with CD/DVD or the like media 521, thumb-drive 522, removable hard drive or solid-state drive 523, legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system 600 can also include an interface to one or more communication networks. Networks can, for example, be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 5G, 5G, LTE and the like, TV wireline or wireless wide-area digital networks to include cable TV, satellite TV, and terrestrial broadcast TV, vehicular and industrial to include CANBus, and so forth. Certain networks commonly require external network interface adapters that attached to certain general-purpose data ports or peripheral buses (449) (such as, for example, USB ports of the computer system 600; others are commonly integrated into the core of the computer system 600 by attachment to a system bus as described below (for example Ethernet interface into a PC computer system or cellular network interface into a smartphone computer system). Using any of these networks, computer system 600 can communicate with other entities. Such communication can be uni-directional, receive only (for example, broadcast TV), uni-directional send-only (for example, CANbus to certain CANbus devices), or bi-directional, for example to other computer systems using local or wide area digital networks. Certain protocols and protocol stacks can be used on each of those networks and network interfaces, as described above.

The aforementioned human interface devices, human-accessible storage devices, and network interfaces can be attached to a core 540 of the computer system 600.

The core 540 can include one or more Central Processing Units (CPU) 541, Graphics Processing Units (GPU) 542, specialized programmable processing units in the form of Field Programmable Gate Areas (FPGA) 543, hardware accelerators for certain tasks 544, and so forth. These devices, along with Read-only memory (ROM) 545, Random-access memory 546, internal mass storage such as internal non-user accessible hard drives, SSDs, and the like 547, maybe connected through a system bus 548. In some computer systems, the system bus 548 can be accessible in the form of one or more physical plugs to enable extensions by additional CPUs, GPU, and the like. The peripheral devices can be attached either directly to the core's system bus 548, or through a peripheral bus 549. Architectures for a peripheral bus include PCI, USB, and the like.

CPUs 541, GPUs 542, FPGAs 543, and accelerators 544 can execute certain instructions that, in combination, can make up the aforementioned computer code. That computer code can be stored in ROM 545 or RAM 546. Transitional data can be also be stored in RAM 546, whereas permanent data can be stored, for example, in the internal mass storage 547. Fast storage and retrieval to any of the memory devices can be enabled through the use of cache memory, which can be closely associated with one or more CPU 541, GPU 542, mass storage 547, ROM 545, RAM 546, and the like.

The computer-readable media can have computer code thereon for performing various computer-implemented operations. The media and computer code can be specially designed and constructed for the purposes of the present disclosure, or they can be of the kind well known and available to those having skill in the computer software arts.

As an example and not by way of limitation, the computer system having architecture 500, and specifically the core 540 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 540 that are of non-transitory nature, such as core-internal mass storage 547 or ROM 545. The software implementing various embodiments of the present disclosure can be stored in such devices and executed by core 540. A computer-readable medium can include one or more memory devices or chips, according to particular needs. The software can cause the core 540 and specifically the processors therein (including CPU, GPU, FPGA, and the like) to execute particular processes or particular parts of particular processes described herein, including defining data structures stored in RAM 546 and modifying such data structures according to the processes defined by the software. In addition or as an alternative, the computer system can provide functionality as a result of logic hardwired or otherwise embodied in a circuit (for example, accelerator 544), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for video conferencing, executable by a processor, comprising:
   receiving video data associated with an immersive teleconferencing session, wherein the video data comprises a 360-degree video stream and one or more overlay media streams;
   identifying a first parameter associated with the video data, wherein the first parameter indicates an overlay rendering type with a first value indicating a viewport relative type and a second value indicating a sphere relative type;
   when the first parameter has the first value, identifying a second parameter, wherein the second parameter indicates overlay media streams to be prioritized during decoding; and
   displaying the video data with the 360-degree video stream and the one or more overlay media streams using the first parameter and the second parameter.

2. The method of claim 1, wherein the first parameter and the second parameter are set during a Session Description Protocol (SDP) negotiation between a sender and a receiver.

3. The method of claim 1, wherein the first parameter and the second parameter are negotiated during an initial SDP negotiation.

4. The method of claim 1, wherein the method further comprises:
   when the first parameter has the first value, identifying a third parameter, wherein the third parameter indicates an opacity for the one or more overlay media streams; and
   the displaying the video data with the 360-degree video stream and the one or more overlay media streams comprises using the first parameter, the second parameter, and the third parameter.

5. The method of claim 1, wherein the method comprises identifying a fourth parameter that defines a list of overlay ids associated with the one or more overlay media streams.

6. The method of claim 5, wherein the method further comprises identifying a fifth parameter that defines the list of overlay ids shared by a sender and supported by a receiver at a given time instance.

7. The method of claim 6, wherein a value of the fifth parameter is based on the second parameter.

8. The method of claim 1, wherein the method further comprises a sixth parameter that defines a list of allowed senders from whom a receiver may receive and use overlays.

9. A computer system for video conferencing, the computer system comprising:
   one or more computer-readable non-transitory storage media configured to store computer program code; and
   one or more computer processors configured to access said computer program code and operate as instructed by said computer program code, said computer program code including:
      first receiving code configured to cause the one or more computer processors to receive video data associated with an immersive teleconferencing session, wherein the video data comprises a 360-degree video stream and one or more overlay media streams;
      first identifying code configured to cause the one or more computer processors to identify a first parameter associated with the video data, wherein the first parameter indicates an overlay rendering type with a first value indicating a viewport relative type and a second value indicating a sphere relative type;
      second identifying code configured to cause the one or more computer processors to identify, when the first parameter has the first value, a second parameter, wherein the second parameter indicates overlay media streams to be prioritized during decoding; and
      displaying code configured to cause the one or more computer processors to, display the video data with the 360-degree video stream and the one or more overlay media streams using the first parameter and the second parameter.

10. The computer system of claim 9, wherein the first parameter and the second parameter are set during a Session Description Protocol (SDP) negotiation between a sender and a receiver.

11. The computer system of claim 9, wherein the first parameter and the second parameter are negotiated during an initial offer-answer SDP negotiation.

12. The computer system of claim 9, wherein the computer program code further comprises:
    third identifying code configured to cause the one or more computer processors to identify, when the first parameter has the first value, a third parameter, wherein the third parameter indicates an opacity for the one or more overlay media streams; and
    the displaying code is further configured to cause the one or more computer processors to display the video data with the 360-degree video stream and the one or more overlay media streams comprises using the first parameter, the second parameter, and the third parameter.

13. The computer system of claim 9, wherein the computer program code further comprises:
    fourth identifying code configured to cause the one or more computer processors to identify a fourth parameter that defines a list of overlay ids associated with the one or more overlay media streams.

14. The computer system of claim 13, wherein the computer program code further comprises:
    fifth identifying code configured to cause the one or more computer processors to identify a fifth parameter that defines the list of overlay ids shared by a sender and supported by a receiver at a given time instance.

15. The computer system of claim 14, wherein a value of the fifth parameter is based on the second parameter.

16. The computer system of claim 9, wherein the computer program code further comprises:
    sixth identifying code configured to cause the one or more computer processors to identify a sixth parameter that defines a list of allowed senders from whom a receiver may receive and use overlays.

17. A non-transitory computer readable medium having stored thereon a computer program for video conferencing, the computer program configured to cause one or more computer processors to:
    receive video data associated with an immersive teleconferencing session, wherein the video data comprises a 360-degree video stream and one or more overlay media streams;
    identify a first parameter associated with the video data, wherein the first parameter indicates an overlay rendering type with a first value indicating a viewport relative type and a second value indicating a sphere relative type;
    when the first parameter has the first value, identifying a second parameter, wherein the second parameter indicates overlay media streams to be prioritized during decoding; and display the video data with the 360-degree video stream and the one or more overlay media streams using the first parameter and the second parameter.

18. The non-transitory computer readable medium of claim 17, wherein the first parameter and the second parameter are set during a Session Description Protocol (SDP) negotiation between a sender and a receiver.

19. The non-transitory computer readable medium of claim 17, wherein the first parameter and the second parameter are negotiated during an initial offer-answer SDP negotiation.

20. The non-transitory computer readable medium of claim 17, wherein the computer program is further configured to cause one or more computer processors to identify, when the first parameter has the first value, a third parameter, wherein the third parameter indicates an opacity for the one or more overlay media streams; and
    the displaying the video data with the 360-degree video stream and the one or more overlay media streams comprises using the first parameter, the second parameter, and the third parameter.

* * * * *